United States Patent
Fasick et al.

(10) Patent No.: US 11,641,791 B2
(45) Date of Patent: May 9, 2023

(54) BIDIRECTIONAL STEERING SYSTEM FOR AN AGRICULTURAL VEHICLE

(71) Applicant: CNH Industrial America LLC, New Holland, PA (US)

(72) Inventors: Gregory T. Fasick, Hatfield, PA (US); Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 203 days.

(21) Appl. No.: 16/825,438

(22) Filed: Mar. 20, 2020

(65) Prior Publication Data

US 2021/0289682 A1  Sep. 23, 2021

(51) Int. Cl.
*A01B 69/04* (2006.01)
*B62D 15/02* (2006.01)

(52) U.S. Cl.
CPC .......... *A01B 69/008* (2013.01); *B62D 15/021* (2013.01)

(58) Field of Classification Search
None
See application file for complete search history.

(56) References Cited

U.S. PATENT DOCUMENTS

| | | | |
|---|---|---|---|
| 8,733,770 B2 | 5/2014 | Nafziger et al. | |
| 9,930,824 B2 | 4/2018 | Nafziger et al. | |
| 10,028,442 B1 * | 7/2018 | Crosby | A01B 69/008 |
| 10,421,484 B2 | 9/2019 | Fay, II | |
| 10,829,150 B1 * | 11/2020 | Hauser | B62D 11/04 |
| 10,953,918 B2 * | 3/2021 | Graham | B60B 33/04 |
| 2006/0226685 A1 * | 10/2006 | Priepke | B60N 2/143 |
| | | | 297/344.24 |
| 2018/0093708 A1 | 4/2018 | Soldan | |
| 2018/0201310 A1 * | 7/2018 | Rotole | B62D 11/24 |
| 2020/0229340 A1 * | 7/2020 | Honeyman | A01B 69/008 |
| 2020/0231208 A1 * | 7/2020 | Dreyer | B62D 1/12 |

FOREIGN PATENT DOCUMENTS

CN  203064024 U  7/2013

* cited by examiner

*Primary Examiner* — Tamara L Weber
(74) *Attorney, Agent, or Firm* — Patrick M. Sheldrake; Peter Zacharias (57) ABSTRACT

An agricultural vehicle configured for traveling in a driven-wheel-leading mode and a caster-wheel-leading mode. The agricultural vehicle includes a first driven wheel and a second driven wheel, a caster axle, a first caster wheel and a second caster wheel, and a steering system. The steering system includes a first steering actuator connected in between the caster axle and the first caster wheel, a first sensor connected to the caster axle, and a controller operably connected to the first steering actuator and the first sensor. The controller is configured for actuating the first steering actuator to steer the first caster wheel in the driven-wheel-leading mode and the caster-wheel-leading mode.

17 Claims, 6 Drawing Sheets

BIDIRECTIONAL STEERING SYSTEM FOR AN AGRICULTURAL VEHICLE

BACKGROUND OF THE INVENTION

The present invention pertains to agricultural harvesters and, more specifically, to a steering system for an agricultural harvester.

An agricultural harvester known as a "windrower" is used to cut and place crop material into a windrow for subsequent harvesting or baling by another agricultural machine in a secondary operation. Some of the crops processed by windrowers include hay, forage, and other small-grain crops. A windrower can be self-propelled and may include a chassis, front and rear wheels supporting the chassis, a prime mover, a cab, and a detachable header such as a sickle bar header or a draper header for cutting and placing the crop material on the field in the windrow. The front wheels are typically steerable wheels that are driven by drive motors. The rear wheels are typically caster wheels which follow the steered wheels.

A windrower generally has different operating modes, such as a normal operation mode, an in-field operation mode, a high-speed operation mode, etc. The windrower is typically steered by using differential steering for both in-field operation mode and high-speed operation mode. In a differential steering system, the speed of the front wheels is varied to turn the windrow. For instance, in a left turn steering maneuver, the left wheel may be rotated slower than the right wheel. The differential steering system of the front wheels in combination with the passive caster wheels allows the windrower to advantageously perform turns with a zero-degree turning radius; hence, significantly increasing the maneuverability of the windrower. Such maneuverability however may be disadvantageous at high speeds in the high-speed operation mode, for example when traveling along roadways. The inherent instability of the rear caster wheels, due to their ability to freely rotate 360 degrees, may decrease the overall stability of the windrower at high speeds.

The stability of the windrower at high speeds may be increased by actively steering one or both of the rear caster wheels. For example, one of the rear caster wheels may be coupled to a hydraulic cylinder that controls the steering angle of the rear caster wheel to match the turn radius of the front drive wheels. Thereby, the windrower is less prone to undesirably moving at high speeds since the rear caster wheels are not able to rotate independently of the differentially steered front wheels. However, actively steered rear caster wheels may nevertheless be insufficient to achieve a desired stability of the windrower at high speeds.

What is needed in the art is a cost-effective steering system for increasing the stability of a harvester.

SUMMARY OF THE INVENTION

In one exemplary embodiment formed in accordance with the present invention, there is provided an agricultural vehicle with a bidirectional steering system. The bidirectional steering system automatically orients the operator station to face the forward direction of travel, orients the caster wheels, and steers one or both caster wheels in the driven-wheel-leading mode and the caster-wheel-leading mode. The bidirectional steering system includes at least one steering actuator including a first steering actuator that is connected in between the caster axle and the first caster wheel, at least one sensor including a first sensor that is connected to the caster axle for sensing a position of the first caster wheel relative to the caster axle, and a controller operably connected to the first steering actuator and the first sensor. The controller is configured for actuating the first steering actuator to steer the first caster wheel in the driven-wheel-leading mode and the caster-wheel-leading mode.

In another exemplary embodiment formed in accordance with the present invention, there is provided an agricultural vehicle configured for traveling in a driven-wheel-leading mode and a caster-wheel-leading mode. The agricultural vehicle includes a chassis, a first driven wheel and a second driven wheel each being rotatably connected to the chassis, a caster axle connected to the chassis, a first caster wheel and a second caster wheel each being rotatably connected to the caster axle, and a steering system. The steering system includes at least one steering actuator including a first steering actuator connected in between the caster axle and the first caster wheel, at least one sensor comprising a first sensor connected to the caster axle and configured for sensing a position of the first caster wheel relative to the caster axle, and a controller operably connected to the first steering actuator and the first sensor. The controller is configured for actuating the first steering actuator to steer the first caster wheel in the driven-wheel-leading mode and the caster-wheel-leading mode.

In yet another exemplary embodiment formed in accordance with the present invention, there is provided a steering system for an agricultural vehicle. The agricultural vehicle includes a chassis, a first driven wheel and a second driven wheel, a caster axle, and a first caster wheel and a second caster wheel each being rotatably connected to the caster axle. The agricultural vehicle is configured for traveling in a driven-wheel-leading mode and a caster-wheel-leading mode. The steering system includes at least one steering actuator including a first steering actuator configured for connecting in between the caster axle and the first caster wheel, at least one sensor comprising a first sensor configured for connecting to the caster axle and sensing a position of the first caster wheel relative to the caster axle, and a controller operably connected to the first steering actuator and the first sensor. The controller is configured for actuating the first steering actuator to steer the first caster wheel in the driven-wheel-leading mode and the caster-wheel-leading mode.

In yet another exemplary embodiment formed in accordance with the present invention, there is provided a method for operating an agricultural vehicle. The agricultural vehicle includes a chassis, a first driven wheel and a second driven wheel, a caster axle, and a first caster wheel and a second caster wheel each being rotatably connected to the caster axle. The agricultural vehicle is configured for traveling in a driven-wheel-leading mode and a caster-wheel-leading mode. The method includes an initial step of providing a steering system for the agricultural vehicle comprising at least one steering actuator comprising a first steering actuator configured for connecting in between the caster axle and the first caster wheel, at least one sensor comprising a first sensor configured for connecting to the caster axle, and a controller operably connected to the first steering actuator and the first sensor. The controller is configured for actuating the first steering actuator to steer the first caster wheel. The method further includes sensing, by the first sensor, a position of the first caster wheel relative to the caster axle. The method further includes steering the first caster wheel, by the controller actuating the first steering actuator, in the driven-wheel-leading mode, and steering the first caster wheel, by the controller actuating the first steering actuator, in the caster-wheel-leading mode of the agricultural vehicle.

One possible advantage of the exemplary embodiment of the agricultural vehicle is that the bidirectional steering system automatically orients the operator station and the caster wheels for operating the agricultural vehicle in a driven-wheel-leading mode or a caster-wheel-leading mode.

Another possible advantage of the exemplary embodiment of the agricultural vehicle is that the bidirectional steering system increases the stability of the agricultural vehicle during roadway transport, wherein the casters wheels are actively steered in a caster-wheel-leading mode.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the vehicle, but they should not be construed as limiting. The terms "longitudinal" and "transverse" are determined with reference to the fore-and-aft direction of the agricultural vehicle and are equally not to be construed as limiting.

Figure 3:
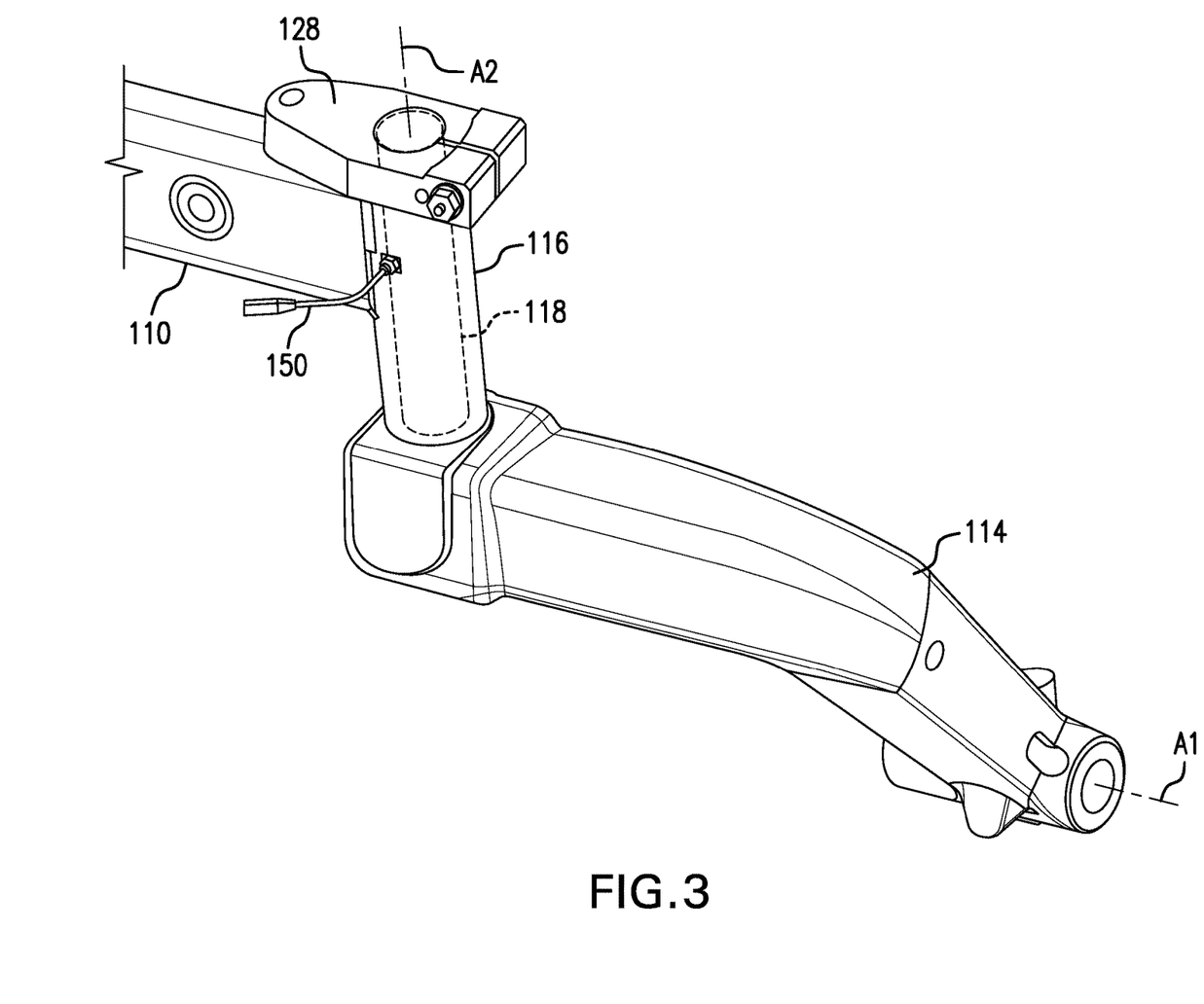
FIG. 3 illustrates another perspective view of the steering system of FIGS. 1-2.
Figure 4:
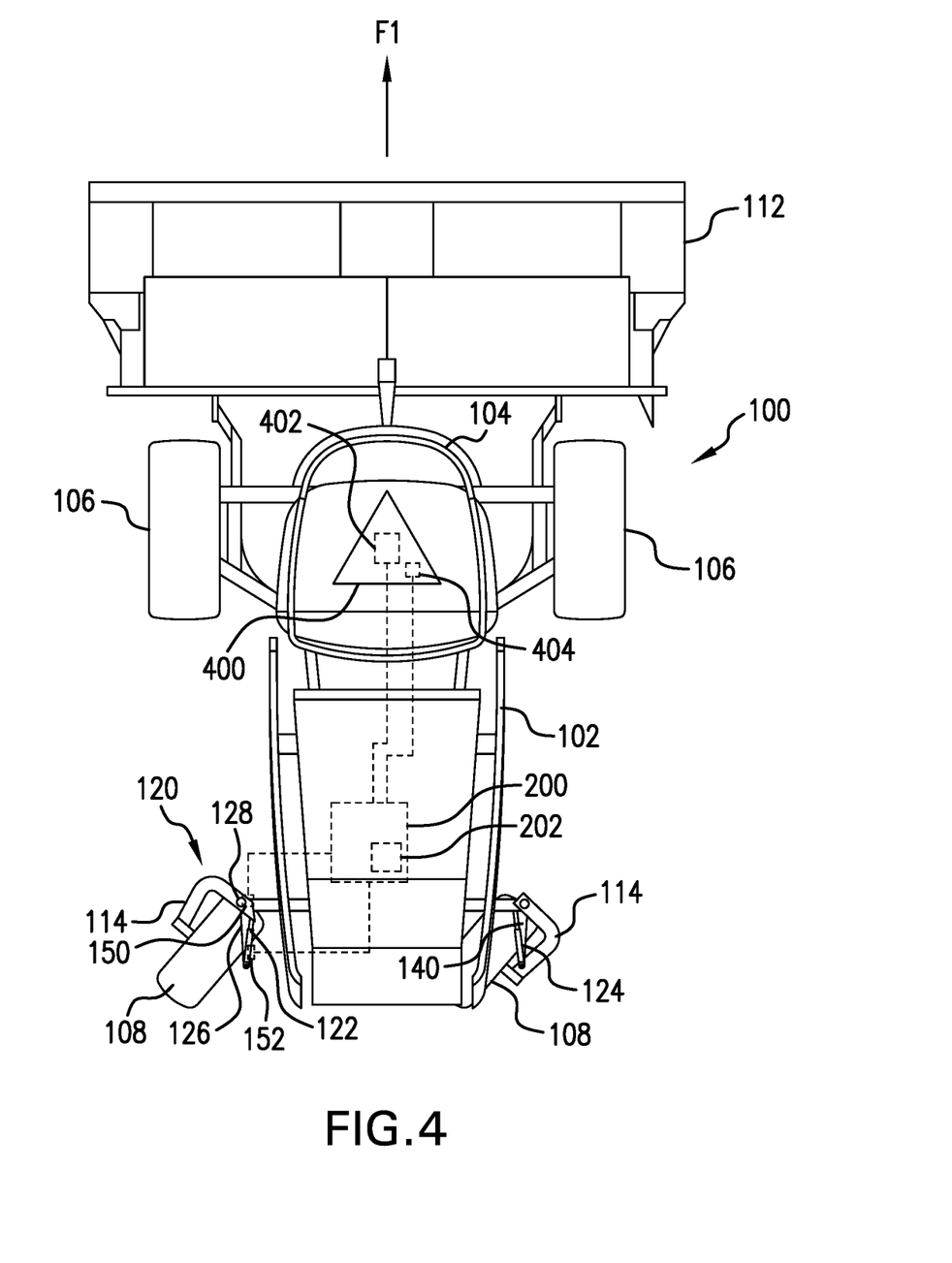
FIG. 4 illustrates a top view of the windrower of FIGS. 1-3 in a driven-wheel-leading mode.
Figure 5:
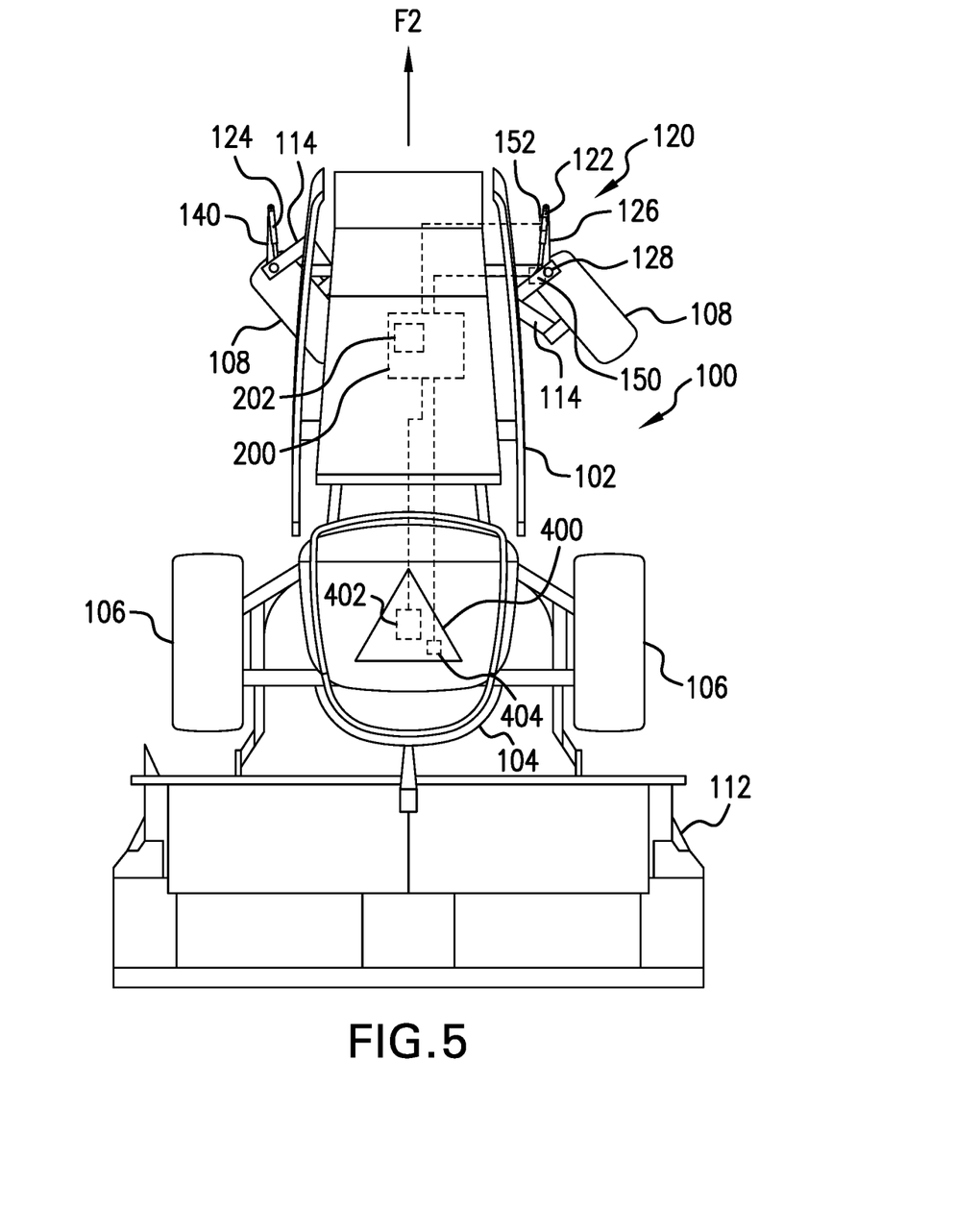
FIG. 5 illustrates a top view of the windrower of FIGS. 1-4 in a caster-wheel-leading mode.

Referring now to the drawings, and more particularly to FIGS. 1-5, there is shown an agricultural vehicle 100. The agricultural vehicle 100 may be in the form of any desired harvester, such as a self-propelled windrower 100. The agricultural vehicle 100 generally includes a chassis 102, a cab 104 mounted the chassis 102, a pair of front powered or driven wheels 106, and a pair of rear caster wheels 108 mounted on a rear caster axle 110. The agricultural vehicle 100 is powered by a prime mover, such as a diesel engine, which drives various components for powering an attachment 112, such as a cutter head 112, and the front driven wheels 106. The agricultural vehicle 100 may have multiple operational modes. For instance, the agricultural vehicle 100 may have a driven-wheel-leading mode (FIG. 4) and a caster-wheel-leading mode (FIG. 5). As used herein, the driven-wheel-leading mode is a manner of operating the agricultural vehicle 100 with the driven wheels 106 and cab 104 leading in front of the caster wheels 108 in relation to the forward direction of travel. The driven-wheel-leading mode may include in-field operation at low speeds, such as when mowing the field, and roadway operation at high speeds. Furthermore, the caster-wheel-leading mode is a manner of operating the agricultural vehicle 100 with the caster wheels 108 and engine leading in front of the driven wheels 106. The caster-wheel-leading mode may include in-field operation and roadway operation.

The cab 104 is connected to and supported by the chassis 102. During operation of the agricultural vehicle 100, the cab 104 houses the operator. In order to control the operation of the agricultural vehicle 100, the cab 104 has an operator station 400 housed therein (FIGS. 4-5). The operator station 400 generally includes an operator seat, a steering column, and a control console. The operator station 400 may be rotatably connected to the chassis 102, for example the floor of the cab 104.

Figure 1:
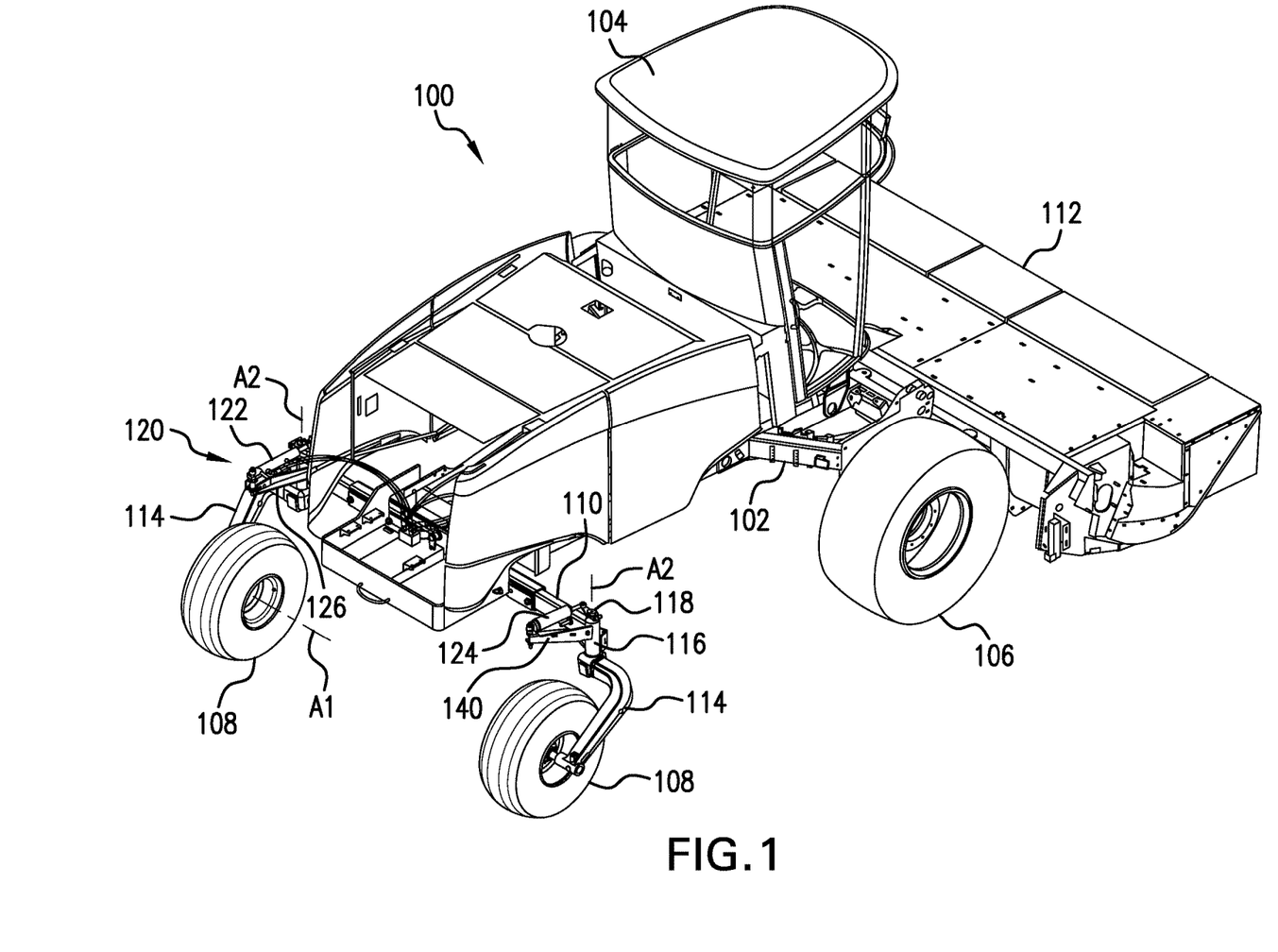
FIG. 1 illustrates a perspective view of an exemplary embodiment of a self-propelled windrower, the windrower including driven front wheels, rear caster wheels, and a steering system for steering the caster wheels, in accordance with an exemplary embodiment of the present invention.
Figure 2:
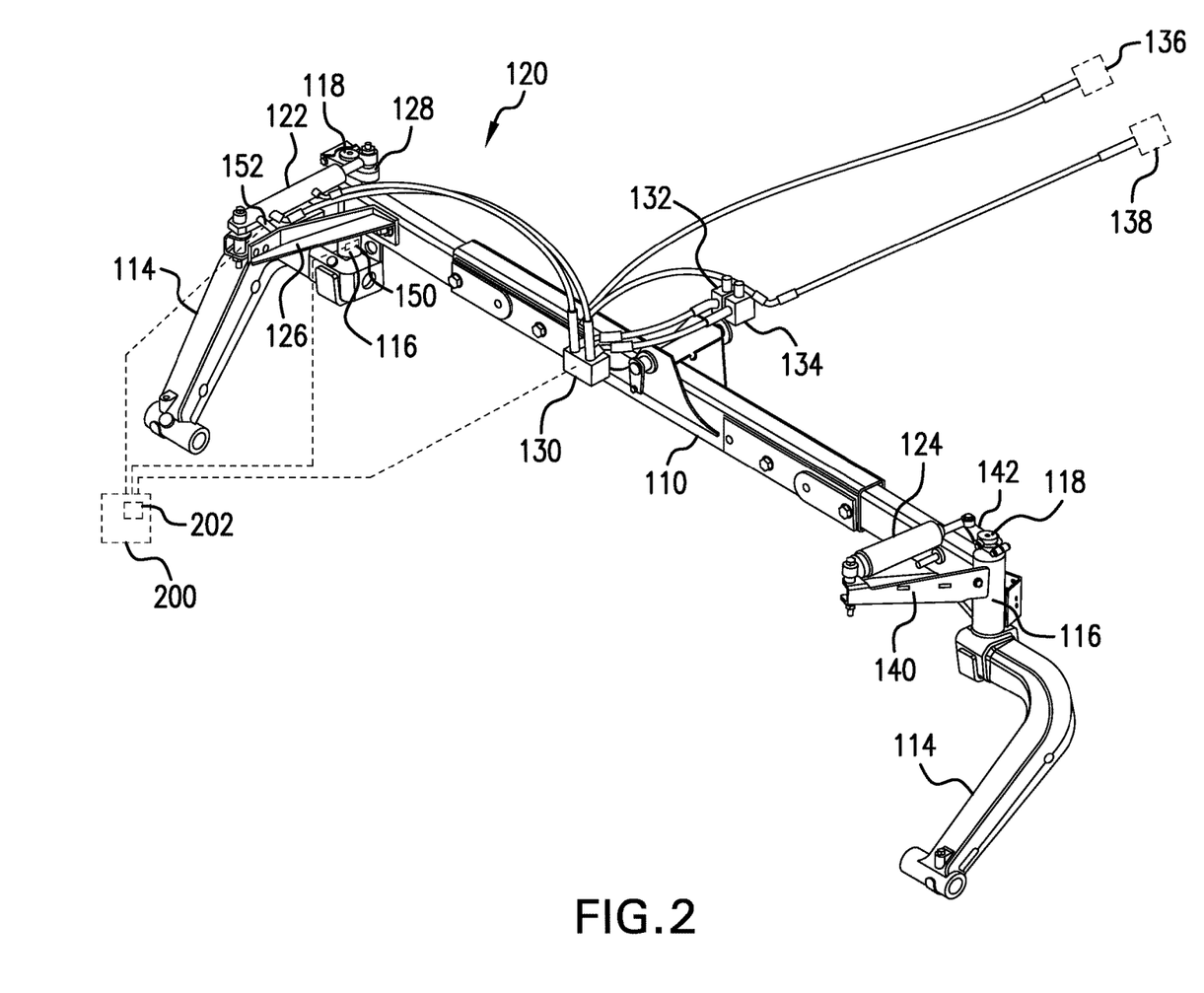
FIG. 2 illustrates a perspective view of the steering system of FIG. 1.

The caster wheels 108 are rotatably connected to respective casters 114. Each caster 114 is rotatably connected to the caster axle 110 by a sleeve bearing 116 and an upright shaft 118 disposed within the sleeve bearing 116 (FIG. 3). One caster 114 is located at the left lateral end of the caster axle 110 and the other caster 114 is located at the right lateral end of the caster axle 110. The casters 114 independently rotate relative to one another. The caster wheels 108 rotate about a horizontal axis of rotation A1, and the casters 114 rotate about a vertical axis of rotation A2 (FIG. 1). The caster wheels 108 and casters 114 may be in the form of any desired caster wheels 108 and casters 114, respectively.

The agricultural vehicle 100 further includes a bidirectional steering system 120 that automatically orients the operator station 400 to face the forward direction of travel F1, F2, orients the caster wheels 108, and steers one or both caster wheels 108 in either operational mode of the agricultural vehicle 100, i.e., the driven-wheel-leading mode (FIG. 4) or caster-wheel-leading mode (FIG. 5). Thereby, at low or high speeds in the field or on the road in the driven-wheel-leading or caster-wheel-leading mode, the agricultural vehicle 100 may have increased stability by actively matching the steering angle of one or both caster wheels 108 with the turn radius of the driven wheels 106. The bidirectional steering system 120 may be connected to the chassis 102. The bidirectional steering system 120 generally includes at least one steering actuator 122, at least one damper 124, at least one steering sensor 150, 152, at least one station actuator 402, at least one station sensor 404, and a controller 200. As shown, only one caster wheel 108 is steered by one steering actuator 122 while the other caster wheel 108 is damped by one damper 124. However, it should be appreciated that both casters 114 may be steered by respective steering actuators 122.

The steering actuator 122 actively steers one caster 114. The steering actuator 122 is pivotally connected in between a flange 126, which is fixedly connected to the caster axle 110, and a pivot arm 128, which is rigidly connected to the top of the shaft 118. The steering actuator 122 is rotatable about the axis of rotation A2 of the caster 114. Thereby, the steering actuator 122 may actively control the rotation of the caster 114 via rotating the pivot arm 128 which in turn rotates the shaft 118. The steering actuator 122 may be in the form of any desired actuator, such as a hydraulic or electric cylinder and/or motor. As shown, the steering actuator 122 is in the form of a hydraulic cylinder 122. The hydraulic cylinder 122 may be fluidly connected to a steering proportional valve 130, blocking valves 132, 134, a steering pump 136, and a fluid reservoir 138 via respective fluid lines.

During a non-steering operation, the valves 132, 134 are open to the reservoir 138 so that hydraulic fluid may freely flow in between the hydraulic cylinder 122 and the reservoir 138. During an active steering operation, the controller 200 may selectively operate the valves 130, 132, 134 to extend and retract the hydraulic cylinder 122.

The damper 124 passively dampens the movement of one caster 114 and accordingly the caster wheel 108 attached thereto. The damper 124 does not steer the caster 114. The damper 124 is pivotally connected in between a flange 140, which is fixedly connected to the caster axle 110, and a pivot arm 142, which is rigidly connected to the top of the shaft 118. The damper 124 is rotatable about the axis of rotation A2 of the caster 114, as defined by the shaft 118. As the pivot arm 142, the shaft 118, and the caster 114 rotate together, the flange 140 remains stationary in a fixed position on the caster axle 110. Accordingly, the damper 124 extends and retracts for damping the movement of the caster 114. The damper 124 may be in the form of a shock absorber, a shimmy damper, or any other desired damper. It should be appreciated that the bidirectional steering system 120 may not include a damper if both caster wheels 108 are steered by respective actuators 122.

The one or more steering sensors 150, 152 may include a proximity sensor 150 connected to the caster axle 110 and/or an actuator steering sensor 152 coupled to the steering actuator 122. The proximity sensor 150 may be mounted on the shaft 118 and extend through a corresponding hole or slot (unnumbered) in the bearing 116. The proximity sensor 150 can determine an amount of rotation of the shaft 118 relative to a stationary portion of the caster axle 110; and thus, determine a corresponding position of the caster 114 and caster wheel 108 connected to the caster 114. The proximity sensor 150 may be configured to sense a target, such as any desired portion of the shaft 118. It should be appreciated that the bidirectional steering system 120 may include only one or multiple proximity sensors 150. For example, the left and right shafts 118 may each have only one proximity sensor 150. Alternatively, for example, the bidirectional steering system 120 may have four total proximity sensors 150, wherein each shaft 118 has two proximity sensors 150 disposed on opposite sides of the caster axle 110. Thereby, each shaft 118 may sense whether its respective caster wheel 108 is in front of or behind the caster axle 110. Further, it is conceivable that only the shaft 118 of the steerable caster wheel 108 may have one or more proximity sensors 150 associated therewith. The proximity sensor 150 may be in the form of any desired sensor, such as a Hall effect sensor, a capacitive sensor, an inductive sensor, an optical sensor, or an ultrasonic sensor. The actuator steering sensor 152 detects the position or amount of extension/retraction of the steering actuator 122, and subsequently transmits data corresponding to the sensed position of the steering actuator 122 to the controller 200. The actuator steering sensor 152 may include any desired sensor, such as an inductive sensor or variable resistance potentiometer.

The station actuator 402 is connected to the operator station 400 and operably connected to the controller 200. The station actuator 402, which is automatically controlled by the controller 200, may rotate the operator station 400 in between a first position in the driven-wheel-leading mode in which the operator station 400 faces or points toward the first direction of travel F1 (FIG. 4) and a second position in the caster-wheel-leading mode in which the operator station 400 points toward the second direction of travel F2 (FIG. 5). The station actuator 402 may be in the form of any desired actuator, such as a motor or cylinder. For instance, the station actuator 402 may be in the form of a hydraulic motor which is fluidly connected to various hydraulic devices, e.g. pumps, valves, and reservoir. The bidirectional steering system 120 may include two or more station actuators 402 for rotating the operator station 400.

The station sensor 404 can be connected to the operator station 400, the station actuator 402, or the chassis 102. The station sensor 404 senses a position of the operator station 400. More particularly, the station sensor 404 may determine a rotational alignment of the operator station 400 by sensing a portion of the operator station 400 relative to the chassis 102 or a portion of the chassis 102 relative to the operator station 400. Alternatively, the station sensor 404 may sense a position of the actuator 402 and extrapolate a corresponding position of the operator station.

The controller 200 may be operably connected to the actuators 122, 402 and the sensors 150, 152, 404 via a wired or wireless connection. The controller 200 may also be operably connected to any other desired component of the agricultural vehicle 100, such as a user interface on the operator station 400, a speed sensor, a gear indicator, etc. The controller 200 may include a memory 202. The controller 200 may be in the form of any desired controller, for example a vehicle control unit (VCU). Upon selection of a desired operational mode by the operator, the controller 200 automatically orients the operator station 400 to face the forward direction of travel F1, F2. The controller 200 also positions the caster wheels 108 in a first orientation in the driven-wheel-leading mode (FIG. 4) and a second orientation in the caster-wheel-leading mode which is 180 degrees offset from the first orientation (FIG. 5). In other words, the casters 114 are rotated 180 degrees so that in the driven-wheel-leading mode the outside surfaces of the casters 114 face outwardly and in the caster-wheel-leading mode the outside surfaces of the casters 114 face inwardly toward the chassis 102. To position the caster wheels 108, the controller 200 may at first determine a starting position of the casters 114, via the sensor(s) 150, 152, and if need be subsequently move the agricultural vehicle 100 forward or rearward to rotate the casters 114 in the desired orientation for operation in the driven-wheel-leading mode or caster-wheel-leading mode. Once the casters 114 are oriented as desired, the controller 200 may extend and retract the steering actuator 122 to steer the caster wheels 108 in line with the turn radius of the driven wheels 106. For example, as shown in FIG. 4, the operator is conducting a left turn in the drive-wheel leading mode, and the controller 200 has automatically retracted the steering actuator 122 to track the position the caster wheels 108 with the turn radius of the front wheels 106. Additionally, for example and as shown in FIG. 5, the operator is conducting a left turn in the caster-wheel-leading mode, and the controller 200 has automatically extended the steering actuator 122 to track the position of the caster wheels 108 with the turn radius of the driven wheels 106.

Figure 6:
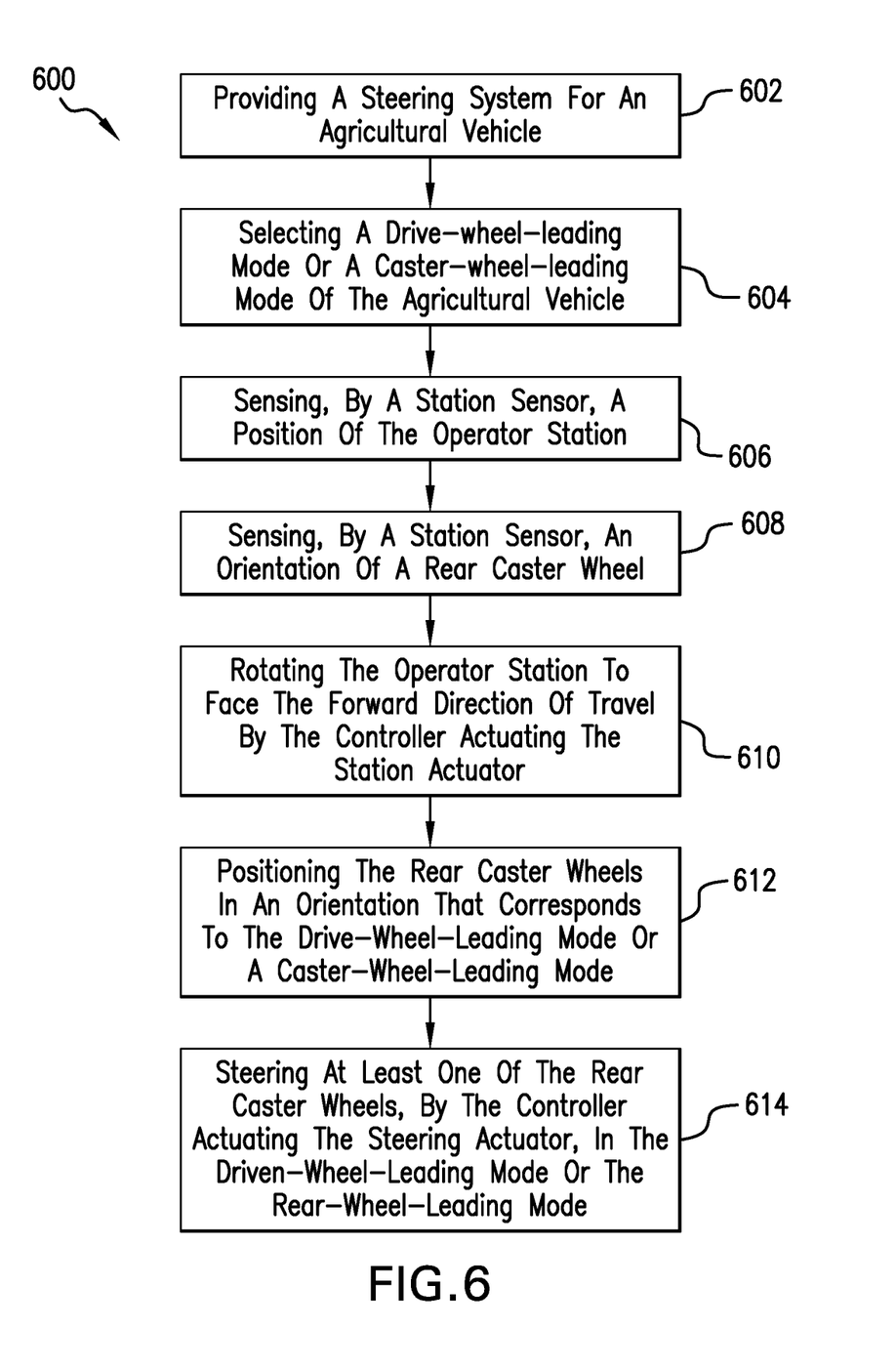
FIG. 6 illustrates a flow chart of a method for operating the windrower, in accordance with an exemplary embodiment of the present invention.

Referring now to FIG. 6, there is shown a flowchart of a method 600 for operating the agricultural vehicle 100. The method 600 includes an initial step of providing the bidirectional steering system 120, as discussed above (at block 602). In operation, the operator may select a desired operational mode via inputting a user command into a user interface on the operator station 400 (at block 604). For example, the operator may select a mode for roadway transport, wherein the agricultural vehicle 100 is in the caster-wheel-leading mode or the driven-wheel-leading mode, with active steering of the caster wheels 108. Also, for example, the operator may select a mode for in-field operation, wherein the agricultural vehicle 100 is in the casterwheel-leading mode with active steering of the caster wheels 108. Then, the station sensor 404 may detect the orientation of the operator station 400 (at block 606). Therewith, the one or more steering sensors 150, 152 may sense an orientation of the caster wheel(s) 108 (at block 608). If need be, the controller 200 may then automatically rotate the operator station 400 to face the forward direction of travel F1, F2 of the correspondingly selected mode by actuating the station actuator 402 (at block 610). Thereafter or concurrently therewith, the controller 200 may position the caster wheels 108 in their corresponding orientation for operation in the driven-wheel-leading mode or the caster-wheel-leading mode (at block 612). Then, depending upon the operational mode selected, the controller 200 may actively steer one or both of the caster wheels 108 by actuating a respective steering actuator 122 to match the steering angle of the caster wheel(s) 108 with the turn radius of the driven wheels 106 (at block 614). As can be appreciated, the controller 200 may also allow the caster wheels 108 to passively follow the driven wheels in the driven-wheel-leading mode or the caster-wheel-leading mode.

It is to be understood that the steps of the method 600 is performed by the controller 200 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 200 described herein, such as the method 600, is implemented in software code or instructions which are tangibly stored on a tangible computer readable medium. The controller 200 loads the software code or instructions via a direct interface with the computer readable medium or via a wired and/or wireless network. Upon loading and executing such software code or instructions by the controller 200, the controller 200 may perform any of the functionality of the controller 200 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural vehicle configured for traveling in a driven-wheel-leading mode and a caster-wheel-leading mode, comprising:
a chassis;
a first driven wheel and a second driven wheel each being rotatably connected to the chassis;
a caster axle connected to the chassis;
a first caster wheel and a second caster wheel each being rotatably connected to the caster axle; and
a steering system, comprising:
at least one steering actuator comprising a first steering actuator connected in between the caster axle and the first caster wheel;
at least one sensor comprising a first sensor connected to the caster axle, the first sensor being configured for sensing a position of the first caster wheel relative to the caster axle;
a controller operably connected to the first steering actuator and the first sensor, the controller being configured for actuating the first steering actuator to steer the first caster wheel in the driven-wheel-leading mode and the caster-wheel-leading mode; and
an operator station rotatably connected to the chassis, and wherein the steering system further comprises at least one station actuator connected to the operator station and operably connected to the controller, wherein the controller is configured for automatically rotating the operator station to face a forward direction of travel of the agricultural vehicle.

2. The agricultural vehicle of claim 1, wherein the controller is configured for respectively positioning the first caster wheel and the second caster wheel in a first orientation in the driven-wheel-leading mode and a second orientation in the caster-wheel-leading mode which is 180 degrees offset from the first orientation.

3. The agricultural vehicle of claim 1, wherein the steering system further comprises at least one station sensor operably connected to the controller, the at least one station sensor being configured for sensing a position of the operator station.

4. The agricultural vehicle of claim 1, wherein the controller is configured for matching a steering angle of the first caster wheel with a turn radius of the first driven wheel and the second driven wheel.

5. The agricultural vehicle of claim 1, wherein the steering system further comprises a damper connected to the second caster wheel, the damper being configured for passively damping the second caster wheel.

6. The agricultural vehicle of claim 1, wherein the controller is configured for actuating the first steering actuator to steer the first caster wheel in a field and on a roadway in the caster-wheel-leading mode of the agricultural vehicle.

7. A steering system for an agricultural vehicle, the agricultural vehicle comprising a chassis, a first driven wheel and a second driven wheel, a caster axle, and a first caster wheel and a second caster wheel each being rotatably connected to the caster axle, the agricultural vehicle being configured for traveling in a driven-wheel-leading mode and a caster-wheel-leading mode, the steering system comprising:
at least one steering actuator comprising a first steering actuator configured for connecting in between the caster axle and the first caster wheel;

at least one sensor comprising a first sensor configured for connecting to the caster axle, the first sensor being configured for sensing a position of the first caster wheel relative to the caster axle;

a controller operably connected to the first steering actuator and the first sensor, the controller being configured for actuating the first steering actuator to steer the first caster wheel in the driven-wheel-leading mode and the caster-wheel-leading mode; and a damper configured for connecting to the second caster wheel, the damper being configured for passively damping the second caster wheel as the first caster wheel is steered by the first steering actuator.

8. The steering system of claim 7, wherein the controller is configured for respectively positioning the first caster wheel and the second caster wheel in a first orientation in the driven-wheel-leading mode and a second orientation in the caster-wheel-leading mode which is 180 degrees offset from the first orientation.

9. The steering system of claim 7, wherein the agricultural vehicle further comprises an operator station rotatably connected to the chassis, and wherein the steering system further comprises at least one station actuator configured for connecting to the operator station and operably connected to the controller.

10. The steering system of claim 9, wherein the controller is configured for automatically rotating the operator station to face a forward direction of travel of the agricultural vehicle.

11. The steering system of claim 10, further comprising at least one station sensor operably connected to the controller, the at least one station sensor being configured for sensing a position of the operator station.

12. The steering system of claim 7, wherein the controller is configured for matching a steering angle of the first caster wheel with a turn radius of the first driven wheel and the second driven wheel.

13. The steering system of claim 7, wherein the controller is configured for actuating the first steering actuator to steer the first caster wheel in a field and on a roadway in the caster-wheel-leading mode of the agricultural vehicle.

14. A method for operating an agricultural vehicle, the agricultural vehicle comprises a chassis, a first driven wheel and a second driven wheel, a caster axle, and a first caster wheel and a second caster wheel each being rotatably connected to the caster axle, the agricultural vehicle being configured for traveling in a driven-wheel-leading mode and a caster-wheel-leading mode, the method comprising:

providing a steering system for the agricultural vehicle comprising at least one steering actuator comprising a first steering actuator configured for connecting in between the caster axle and the first caster wheel, at least one sensor comprising a first sensor configured for connecting to the caster axle, and a controller operably connected to the first steering actuator and the first sensor, the controller being configured for actuating the first steering actuator to steer the first caster wheel;

sensing, by the first sensor, a position of the first caster wheel relative to the caster axle;

steering the first caster wheel, by the controller actuating the first steering actuator, in the driven-wheel-leading mode; and steering the first caster wheel, by the controller actuating the first steering actuator and dampening the second caster wheel with a damper connected to the second caster wheel, in the caster-wheel-leading mode of the agricultural vehicle.

15. The method of claim 14, further including a step of respectively positioning, by the controller, the first caster wheel and the second caster wheel in a first orientation in the driven-wheel-leading mode and a second orientation in the caster-wheel-leading mode which is 180 degrees offset from the first orientation.

16. The method of claim 14, wherein the agricultural vehicle further comprises an operator station rotatably connected to the chassis, and wherein the steering system further comprises at least one station actuator configured for connecting to the operator station and operably connected to the controller to automatically rotate to face a forward direction of travel of the agricultural vehicle.

17. The method of claim 16, further comprising a step of rotating, by the controller, the operator station to face a forward direction of travel of the agricultural vehicle.

* * * * *